United States Patent [19]
Johnson et al.

[11] 3,858,948
[45] Jan. 7, 1975

[54] BELT TRACK FOR VEHICLES

[75] Inventors: David W. Johnson; Ralph W. Kell, both of Lincoln, Nebr.

[73] Assignee: The Goodyear Tire & Rubber Company, Akron, Ohio

[22] Filed: Apr. 30, 1973

[21] Appl. No.: 355,604

[52] U.S. Cl. .............................. 305/35 EB, 305/38
[51] Int. Cl. ............................................ B62d 55/24
[58] Field of Search .......................... 305/35 EB, 38

[56] References Cited
UNITED STATES PATENTS

| | | | |
|---|---|---|---|
| 3,464,743 | 9/1969 | Hallaman | 305/35 EB |
| 3,480,339 | 11/1969 | Kell | 305/35 EB |
| 3,485,707 | 12/1969 | Spicer | 305/35 EB |
| 3,582,154 | 6/1971 | Russ | 305/35 EB |
| 3,711,165 | 1/1973 | Russ | 305/35 EB |

*Primary Examiner*—David Schonberg
*Assistant Examiner*—John A. Carroll
*Attorney, Agent, or Firm*—F. W. Brunner; R. P. Yaist

[57] ABSTRACT

A flexible endless belt for use on track vehicle with the belt having an inner surface and an opposite outer ground-contacting surface and including a plurality of stiffening members embedded in the body of the belt extending transversely across the width of the belt at least substantially at right angles to the longitudinal direction thereof and disposed in spaced apart planes with respect to the longitudinal centerplane of the belt. Each stiffening member is comprised of a continuous essentially non-compressible, non-extendable monofilament of a synthetic material to impart transverse rigidity to the belt. The stiffening member, for example, may be a monofilament nylon cord.

20 Claims, 9 Drawing Figures

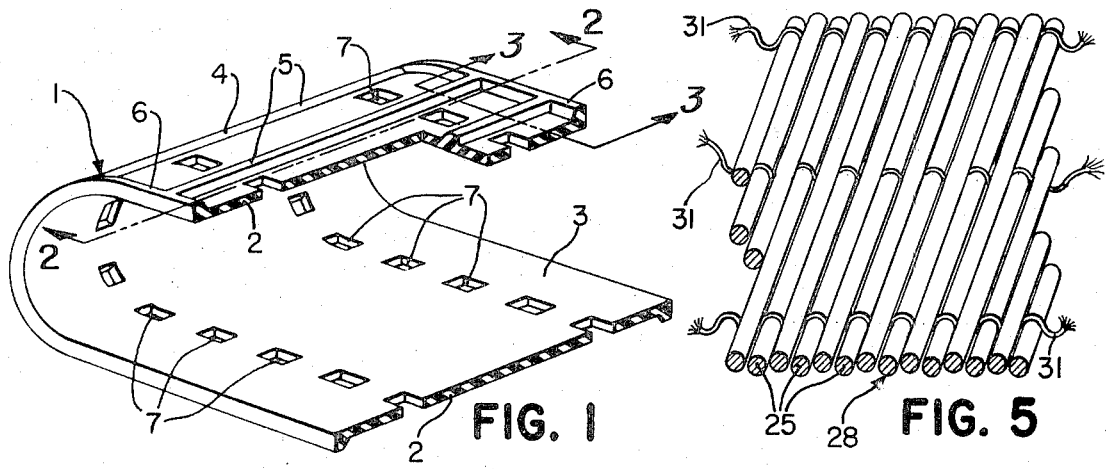
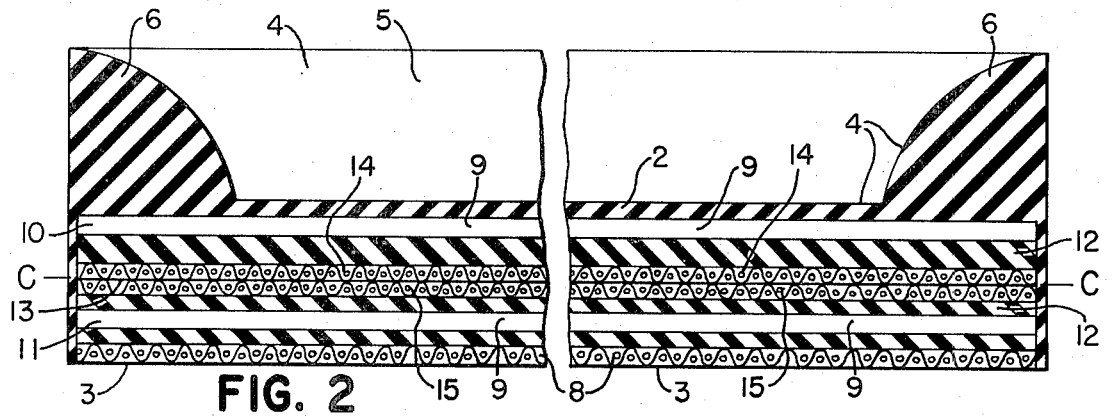
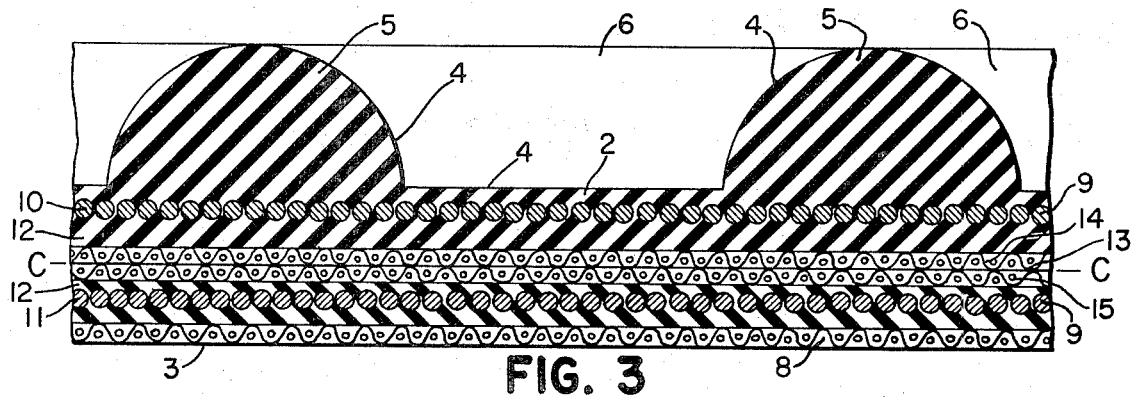
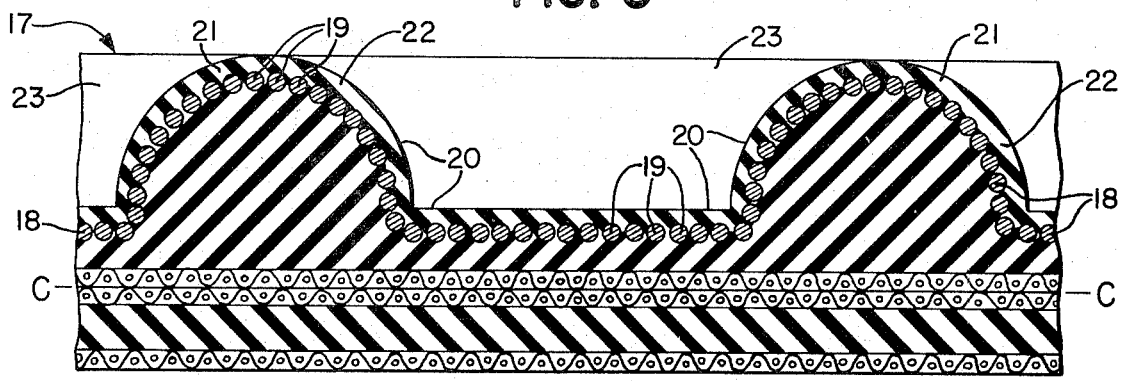
FIG. 1  FIG. 5  FIG. 2  FIG. 3  FIG. 4

BELT TRACK FOR VEHICLES

BACKGROUND OF THE INVENTION

This invention relates to flexible endless belt tracks of the type designed for use on a track vehicle. More specifically, this invention relates to an improved structure for belt tracks used on snowmobile vehicles or the like.

Snowmobiles are small half-ski, half-track motor-driven vehicles used for traveling over the snow and ice which have recently become increasingly popular with hunters, trappers, rescue teams, ski patrols and with winter sports enthusiasts who, for example, use them for racing. These vehicles typically use one or two endless drive belts with lugs or cleats in the outer surface for traction on the silppery surfaces over which they travel. It is extremely important that this type belt be relatively flexible in the longitudinal direction to perform its driving function and yet be substantially stiff or rigid in the transverse direction to prevent belt sag and provide reinforcement for the openings in the belt which engage the sprocket teeth of the vehicle drive. More importantly, the belt must be transversely rigid since it provides the primary vehicle support and flotation over soft snow surfaces.

These belts are generally made of tough, high quality rubber or the like material and are longitudinally reinforced with a high strength textile fabric material such as nylon. Heretofore, one means of accomplishing transverse rigidity has been by the use of a plurality of metal rods or bars extending laterally of the belt. For example, in the prior art, as disclosed by Bombardier, U.S. Pat. No. 2,899,242, "spaced reinforcing rods extending transversely of the belt within the body thereof" provide the required transverse rigidity. It has also been common in the art to bolt, rivet or in some fahion, mechanically attach transverse metal bars or channels onto a planar belt surface to provide the necessary driving traction and transverse rigidity. For example, such a structure is disclosed in Howes, U.S. Pat. No. 3,164,417. In addition, the transverse bars may also be secured onto the body of the belt track by means of the adhesive bond created during vulcanization as disclosed in Kell, U.S. Pat. No. 3,623,780.

However, the use of metal rods or other metallic elements to reinforce a belt has many known disadvantages. For example, the cost of manufacturing such a belt is substantially more than that of a belt reinforced by more conventional materials. Furthermore, the incorporation of metallic elements within elastomeric belts has a detrimental effect on the physical properties thereof and may significantly interfere with the belt's functioning. One of the big disadvantages of the metal cross bars when used as lugs or cleats on the ground-engaging traction surface of the belts is the noise created by the metal bars when contacting other hard surfaces such as concrete or asphalt. The metal elements within or attached to the belt structure also tend to make the belt relatively heavy and difficult to handle during installation. Furthermore, the metal elements can be bent or broken when the vehicle strikes a rock or other hard object which could make it inoperative leaving the user stranded.

It is also known in the art to provide the required transverse rigidity in a belt track by the use of non-metallic elements. For example, Kell, U.S. Pat. No. 3,480,339 discloses a belt construction including two layers of spaced non-metallic cords such as textile tire cord or the like with one of its layers of cords substantially following the contour of the transverse cleats. In addition, Russ, U.S. Pat. No. 3,582,154 disclosed the use of a plurality of closely spaced multi-filament textile stiffening members in the form of a tire cord fabric for the purpose of providing transverse stiffness or rigidity.

These belt structures utilizing non-metallic stiffening members in some instances have not been found to be entirely satisfactory due to inadequate resistance to compressive forces provided by the woven or twisted multifilament cords. Perhaps this is at least in part due to the inherent porosity of the relatively loose woven textile fabric structure. Moreover, transverse reinforcing members or rods comprised of material having low compressive strength such as fiber glass have a tendency to break under compressive forces.

The disadvantages as previously discussed are overcome by the use of the belt structure of the present invention as will be hereinafter described.

OBJECTS OF THE INVENTION

It is a primary object of this invention to provide a belt track for a track vehicle having adequate stiffness or rigidity in a transverse direction without the use of metal rods or bars but which is longitudinally flexible.

It is another important object of the present invention to provide a belt track of improved construction which will have improved resistance to compressive forces to which the track is subjected.

It is another object of this invention to provide a textile fabric reinforcement to be oriented in a generally transverse direction in a belt track for a track vehicle which is of lighter weight and is less subject to breakage than other commonly used stiffening elements.

Other objects and advantages of this invention will become apparent hereinafter as the description thereof proceeds, the novel features, arrangements and combinations being clearly pointed out in the specification as well as the claims thereunto appended.

It has been found that these foregoing objects are accomplished by providing a flexible endless belt of reinforced elastomeric material for use on a track vehicle with the belt comprising a body having an outer groundcontacting surface and an opposite inner surface and including a plurality of stiffening members embedded therein extending transversely across the width of the belt at least substantially at right angles to the longitudinal direction of the belt and disposed in at least two spaced apart planes with respect to the longitudinal centerplane of the belt. Each stiffening member is comprised of a continuous essentially non-compressible non-extendable monofilament of a synthetic material to impart transverse rigidity to the belt.

The use of monofilament cords within the body of a belt track is disclosed in the prior art. In McNeil, U.S. Pat. No. 3,477,767, two layers of such cords laid on an oppositely directed bias surround cross bars disposed within the body of the track with the bias laid cords preventing the puncture of the track by sharp objects. However, it is believed that nowhere in the prior art is the use of monofilament cords disclosed which are disposed at least substantially at right angles to the longitudinal direction of the belt in accordance with the invention described herein for the purpose of providing transverse stiffness or rigidity.

BRIEF DESCRIPTION OF THE DRAWINGS

In the drawings:

FIG. 1 is a perspective view partially in section of the belt track of this invention;

FIG. 2 is an enlarged section taken on line 2—2 of FIG. 1;

FIG. 3 is an enlarged section taken on line 3—3 of FIG. 1;

FIG. 4 is a modification of the invention shown in FIG. 3;

FIG. 5 is a perspective view of the preferred form of the transverse reinforcement of the invention;

DESCRIPTION OF THE PREFERRED EMBODIMENTS

Figure 6:
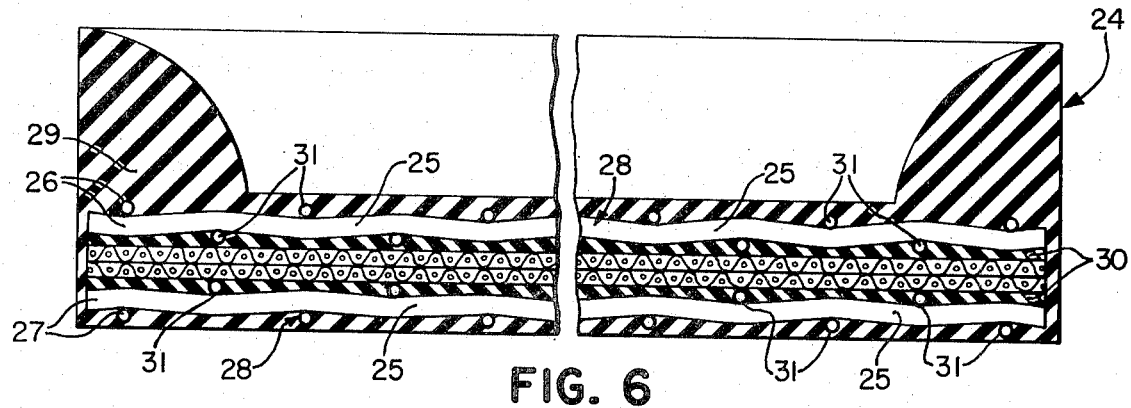
FIGS. 6 and 7 are preferred forms of the invention shown in FIGS. 2 and 3 respectively in which the reinforcement of FIG. 5 is incorporated into the belt track.

In FIG. 1 a flexible endless belt track 1 of the type used on track-laying vehicles such as snowmobiles or the like is shown having a body 2 of reinforced elastomeric material. The belt body 2 has a substantially flat or planar inner drive-contacting surface 3 to engage the face of the vehicle drive sprockets (not shown). A ground-contacting traction surface 4 containing a plurality of transversely extending cleats or corrugations 5 is located on the opposite side of the belt track 1 from the surface 3. The corrugations 5 preferably extend between and connect with ribs or raised portions 6 located along the lateral edges of the belt 1 thereby providing traction in both the longitudinal and transverse directions. In order for the belt track 1 to function as a driving belt, two rows of spaced openings 7 to receive the sprocket teeth from the vehicle drive (not shown) lie between the corrugations 5 and extend through the body portion 2 of the belt. Of course, it is to be understood that in some instances only one row or even more than two rows of openings may be provided depending upon the type of drive being used.

The detailed structure of the belt track 1 of this invention is best shown in FIGS. 2 and 3. The driving surface 3 of the belt is formed by the drive cover 8 which is composed of a flexible material such as one ply of rubber-impregnated square-woven textile fabric extending the length and width of the belt. The composition of the fabric ply is preferably nylon but may be of any well-known conventional natural or synthetic textile materials such as cotton, rayon or polyester.

The body 2 of the belt 1 further includes a plurality of stiffening members 9 embedded therein extending transversely across the width of the belt at least substantially at right angles to the longitudinal direction of the belt. Each stiffening member 9 is comprised of a continuous, essentially non-compressible, non-extendable monofilament of a synthetic material and particularly a synthetic textile material which imparts transverse rigidity to the belt.

It is preferred that the stiffening members be comprised of a thermoplastic material selected from the group consisting of nylon or polyester. For example, it has been found that a nylon monofilament cord produced by E I duPont de Nemours & Company sold under the trademark Vylor having a denier of 10,600 and a diameter of about 0.045 of an inch produces a very satisfactory stiffening member. It is estimated that the monofilament cords should have a denier in the range of from about 1,100 to 27,600 with a diameter of from about 0.015 to about 0.075 of an inch. It is even more preferred that the monofilament cords have a denier of from about 4,400 to about 17,600 and a diameter of from about 0.020 to about 0.060 of an inch. If the monofilament cords are composed of a polyester material, the above denier and thickness ranges may vary somewhat but will be essentially the same.

It is to be understood that other thermoplastic material capable of being processed in monofilament form such as polypropylene may also be used in the practice of this invention. However, it should be appreciated that the use of such a material having a relatively low melting temperature is limited. For instance, polypropylene monofilaments may be most advantageously used when incorporated into belt tracks composed of polymeric or elastomeric material such as polyurethane which may be cured at temperatures below 280°F.

Other synthetic textile materials may also be used to produce the monofilament cords of the present invention which are not now available but may in the future be provided in the form of an essentially non-compressible, non-extendable monofilament. An example of such material may be a poly (p-benzamide) homopolymer having a high molecular weight which is produced by the E I dePont de Nemours & Company identified as "Fiber B." This material is more fully described in French Patent No. 1,526,745, the teachings of which are incorporated by reference herein.

The stiffening members are disposed in at least two spaced apart or distinctly separate planes with respect to the longitudinal centerline or centerplane of the belt. As shown in FIGS. 2 and 3, the stiffening members 9 may be provided in two spaced generally parallel layers or rows 10 and 11 which are spaced apart planes with respect to the longitudinal centerplane C—C of the belt 1. A layer 12 of elastomeric material such as rubber or the like is incorporated in the body 2 between the rows 10 and 11 of monofilament cords 9. One elastomer suitable for this purpose is a high grade, low temperature resistant natural rubber composition. When the cord layers 10 and 11 are spaced from each other in this way, there is thereby produced a so-called column or beam effect within the belt which results in a significant degree of transverse stiffness or rigidity being imparted to the belt track 1. Thus, when the belt track is subjected to bending stresses, a part of the stiffening members 9 are in tension and a part are in compression. As stated previously, the monofilament cords provide a high degree of resistance to compressive forces.

A tension-resisting section 13 normally is positioned between the layers or rows of stiffening members 9 and embedded within the elastomeric layer 12. The section 13 is commonly composed of conventional longitudinal reinforcing material. For example, two plies 14 and 15 of rubber impregnated square-woven nylon fabric will provide the belt track with the necessary longitudinal strength and stability. Textile tire cords or cable cords extending longitudinally of the belt will also accomplish this same purpose.

As shown in FIG. 4, sufficient transverse rigidity may be obtained in a belt track 17 with the use of only one layer or row 18 of stiffening members 19 provided in the form of monofilament cords. In this case the stiffening members 19 are spaced from the ground-contacting surface 20 of the belt 17 and substantially follow the configuration of the raised corrugations 21. Here again, the stiffening members 19 are disposed in two or more separate planes with respect to the longitudinal centerplane C—C of the belt track 17 to produce the desired effect. A ground-engaging cover 22 of elastomeric material is positioned completely over the outer surface of the cord layer 18 to prevent the exposure of the monofilament cords 19. A plurality of rigid corrugations 21 are thereby formed preferably extending between and joining the raised portions 23 of elastomeric material which form a continuous longitudinally extending rib along each lateral edge of the belt track of the type shown in FIG. 1. The raised portions 23 are at substantially the same height as the cleats or corrugations 21 to thereby form the ground-engaging traction surface of the belt as previously discussed. In the embodiment of the invention shown in FIG. 4 it may be necessary that a monofilament cord of heavier denier be employed in order to achieve equivalent results as in the case where two rows of spaced cords are used.

The contour of the corrugations and raised portions may be rounded as shown but may also be of a relatively square or trapezoidal cross-section depending upon the configuration of the particular molding surface used to form the belt track. It should also be noted that the cover and raised portion should be composed of a high grade, low temperature-resistant elastomer, for instance natural or synthetic rubber.

Figure 7:
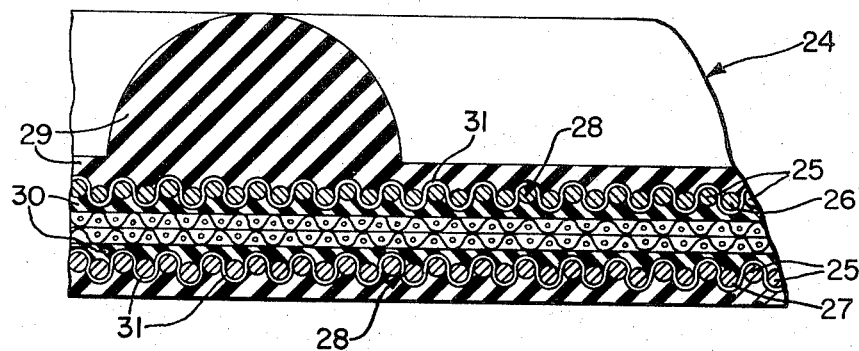

A preferred form of the invention is shown in detail in FIGS. 6 and 7. The belt track 24 includes stiffening members 25 which are provided in the form of two spaced rows 26 and 27 of tire cord fabric 28 embedded in the body 29 of the belt track 24 separated by a layer 30 of elastomeric material.

Details of the tire cord fabric 28 before incorporation into the belt 24 are shown in FIG. 5. The tire cord fabric 28 is produced on suitable equipment such as a loom with the stiffening members 25 comprising the warp of the fabric and fabric elements 31 preferably in the form of fill yarns of textile material comprising the weft. Afterwards, the fabric 28 is cut and the stiffening members 25 are oriented in a transverse direction before being incorporated into the body 29 of the belt track 24.

Referring now to FIGS. 6 and 7, the fabric 28 is comprised of a plurality of stiffening members 25 which when incorporated into the body 29 of the belt 24 extend across the belt in a generally parallel relationship and a plurality of fabric elements 31 extending longitudinally of the belt weaving the stiffening members 25 together. In other words, the fabric elements 31 are interwoven with the stiffening members 25 are disposed at generally right angles thereto with each adjacent element 31 being spaced at a greater distance apart than each adjacent stiffening member 25.

The elements 31 are generally of a lighter denier and have a thinner cross section than the stiffening members 25. The stiffening member 25, for example, may be of a nylon monofilament material as previously described having a denier of 10,600 and a diameter of 0.045 of an inch. Preferably, the fabric elements 31 are comprised of a high strength synthetic yarn such as nylon or polyester which provides improved tear-resistance in a direction parallel to the stiffening members 25. For example, it has been found that a 1,260 denier nylon yarn having a gauge of 0.0135 of an inch provides a suitable fabric element in this regard.

The optimum transverse rigidity and tear strength has been accomplished in the above-described structure with a fabric reinforcement having 21 ends to the inch and 4 picks to the inch. Accordingly, a maximum density of about 95 percent is achieved in regard to the non-compressible stiffening members insuring a highly rigid belt track but one which remains flexible in the longitudinal direction.

Figure 9:
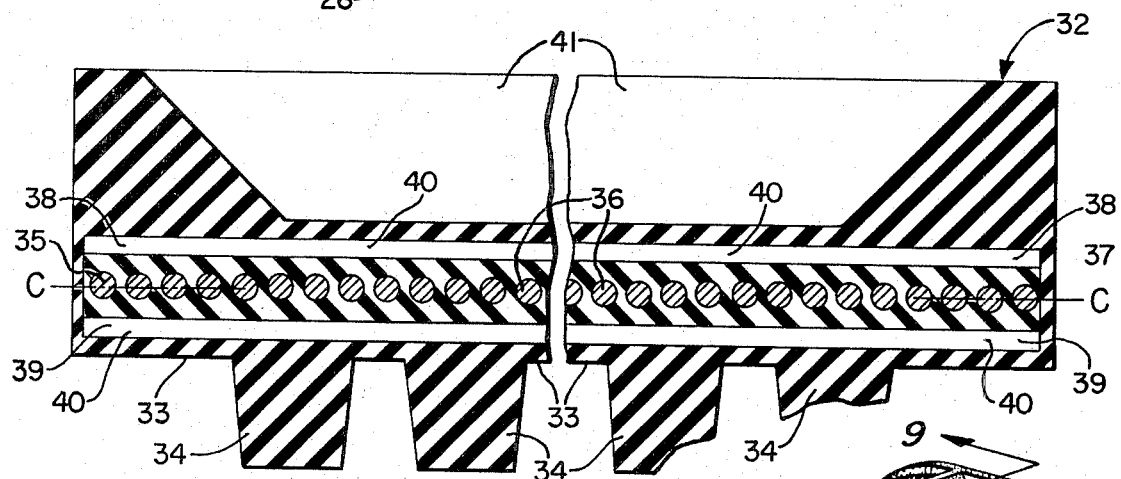
FIG. 9 is an enlarged section taken on line 9—9 of FIG. 8.
Figure 8:
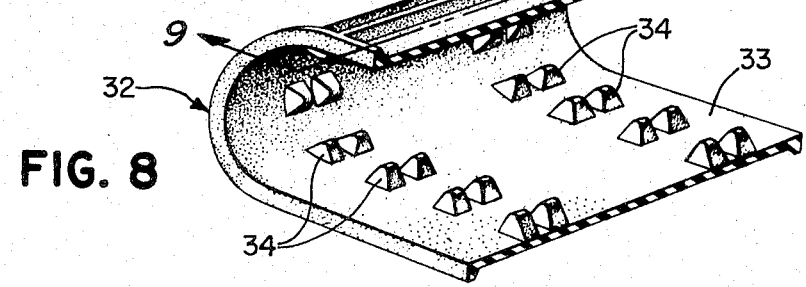
FIG. 8 is another form of the invention shown in FIG. 1.

FIGS. 8 and 9 show another form of the invention in which the belt track 32 has an inner or drive-contacting surface 33 of elastomeric material including a plurality of driving teeth or lugs 34 which are preferably molded on the inner surface 33 of the belt 32 during vulcanization to form an integral structure. The driving lugs 34 are contacted by a driving sprocket of the vehicle drive (not show) rather than having the sprocket teeth engage the belt through sprocket teeth-receiving openings as shown in FIG. 1.

As is most clearly shown in FIG. 9 in this construction the tension-resisting section 35 is comprised of a single layer 36 of nylon or polyester cable cord 37 extending longitudinally of the belt 32. The layer 36 is preferably disposed between the layers 38 and 39 of stiffening members 40. In this instance, the transverse cleats or corrugations 41 are generally trapezoidal in cross section.

The various belting components described may be combined into an integral composite structure by means of conventional vulcanizing apparatus. For instance, a circular mold having the desired surface configuration in which an inside diameter exerts pressure to force the unvulcanized belt track into the mold will produce a truly endless snow track. An autoclave arrangement may also be employed to achieve a satisfactory molded product.

It should be apparent to those skilled in the art that the belt track of this invention including the novel transverse reinforcement provide increased resistance to compressive forces to which the belt track is subjected during operation.

While certain representative embodiments and details have been shown for the purpose of illustrating the invention, it will be apparent to those skilled in the art that various changes and modifications may be made therein without departing from the spirit or scope of the invention.

1. A flexible endless belt of reinforced elastomeric material for use on a track vehicle, said belt comprising a body having an inner surface and an opposite outer ground-contacting surface and including a plurality of stiffening members embedded therein extending transversely across the width of the belt at least substantially at right angles to the longitudinal direction of the belt and disposed in at least two spaced apart planes with respect to the longitudinal centerplane of the belt, each said stiffening member comprised of a continuous non-compressible monofilament of a synthetic material to impart transverse rigidity to the belt, said monofilament throughout at least a majority of its length being in direct contact with the elastomeric material of the body of the belt.

2. The belt as claimed in claim 1 comprising two spaced generally parallel rows of said stiffening members.

3. The belt as claimed in claim 1 wherein the ground-contacting surface includes a plurality of raised corrugations extending transversely of the belt to provide traction and the belt includes at least one row of said stiffening members embedded in said body with the stiffening members being spaced from the ground-contacting surface and substantially following the configuration thereof with some of the stiffening members following the configuration of the raised corrugations so that said members are thereby disposed in two or more separate planes with respect to the longitudinal centerplane of the belt.

4. The belt as claimed in claim 1 wherein said stiffening members are comprised of a thermoplastic material selected from the group consisting of nylon, polyester or polypropylene.

5. The belt as claimed in claim 1 wherein each said stiffening member is comprised of a nylon monofilament cord.

6. The belt as claimed in claim 5 wherein said stiffening members have a denier in the range of from about 1,100 to about 27,600.

7. The belt as claimed in claim 1 wherein said body includes at least one layer of tire cord fabric embedded therein, said fabric comprised of a plurality of said stiffening members extending across the belt in a generally parallel relationship and a plurality of fabric elements extending longitudinally of the belt weaving said stiffening members together, said elements having a thinner cross section than said stiffening members and disposed at generally right angles to said stiffening members with each adjacent element being spaced at a greater distance apart than each adjacent stiffening member so that the majority of the outer peripheral surface of each said stiffening member is free of contact with said elements and is available for direct contact with the elastomeric material of the body of the belt.

8. The belt as claimed in claim 7 wherein said fabric elements are composed of a high strength synthetic yarn.

9. The belt as claimed in claim 2 wherein said body includes a tension-resisting section extending longitudinally of the belt and disposed between said parallel rows of said stiffening members.

10. A belt track for a track-laying vehicle, said belt track comprising a body of flexible elastomeric material having an outer ground-engaging cover to provide traction and an opposite drive-engaging cover to contact the vehicle drive means and including a plurality of stiffening members embedded therein extending transversely across the width of the belt track at least substantially at right angles to the longitudinal direction of the belt and disposed in two or more distinctly separate planes with respect to the longitudinal centerplane of the belt track, each said stiffening member comprised of a continuous essentially non-compressible, nonextendable monofilament of a synthetic textile material to impart transverse rigidity to the belt track, said monofilament throughout at least a majority of its length being in direct contact with the elastomeric material of the body of the belt track.

11. The belt track as claimed in claim 10 comprising two spaced generally parallel rows of said stiffening members.

12. The belt track as claimed in claim 10 wherein the ground-engaging cover includes a plurality of traction cleats extending transversely of the belt and the belt includes at least one row of said stiffening members embedded in said body with the stiffening members being spaced from the outer surface of the ground-engaging cover and substantially following the configuration thereof with some of the stiffening members following the configuration of the traction cleats so that said members are thereby disposed in two or more separate planes with respect to the longitudinal centerplane of the belt track.

13. The belt track as claimed in claim 10 wherein said stiffening members are comprised of a material selected from the group consisting of nylon or polyester.

14. The belt track as claimed in claim 10 wherein each said stiffening member is comprised of a nylon monofilament cord.

15. The belt track as claimed in claim 10 wherein said stiffening members have a denier in the range of from about 4,400 to about 17,600.

16. The belt track as claimed in claim 10 wherein said body includes at least one layer of tire cord fabric embedded therein in which said fabric is comprised of a plurality of said stiffening members extending across the belt track in a generally parallel relationship and a plurality of fabric elements extending longitudinally of the belt track and interwoven with said stiffening members, said elements having a thinner cross section than said stiffening members and disposed at generally right angles to said stiffening members with each adjacent element being spaced at a greater distance apart than each adjacent stiffening member so that the majority of the outer peripheral surface of each said stiffening member is free of contact with said elements and is available for direct contact with the elastomeric material of the body of the belt track.

17. The belt track as claimed in claim 16 wherein said fabric elements are comprised of a high strength synthetic yarn to provide improved tear resistance in a direction parallel to said stiffening members.

18. The belt track as claimed in claim 11 wherein said body includes a tension-resisting section extending longitudinally of the belt track and disposed between said parallel rows of said stiffening members.

19. The belt track as claimed in claim 10 wherein said body includes at least one row of sprocket teethreceiving openings therein for engaging sprocket teeth of a sprocket drive wheel.

20. The belt track as claimed in claim 10 wherein the drive-engaging cover is comprised of a plurality of lugs formed integrally therewith for contact with a sprocket of the vehicle drive.

* * * * *